(12) United States Patent
Kim et al.

(10) Patent No.: US 9,895,642 B2
(45) Date of Patent: Feb. 20, 2018

(54) FILTER DEVICE FOR GAS CONTAINER AND METHOD OF INSTALLING THE SAME

(71) Applicant: Hyundai Motor Company, Seoul (KR)

(72) Inventors: Myeong Hwan Kim, Gyeonggi-do (KR); Young Seung Cho, Gyeonggi-do (KR); Jae Min Lee, Chungcheongnam-do (KR); Pil Seon Choi, Gyeonggi-do (KR); Chang Han Kim, Gwangju (KR); Seung Hoon Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/960,413

(22) Filed: Dec. 6, 2015

(65) Prior Publication Data

US 2017/0043291 A1   Feb. 16, 2017

(30) Foreign Application Priority Data

Aug. 10, 2015   (KR) .................. 10-2015-0112317

(51) Int. Cl.
*B01D 46/00*   (2006.01)
*F17C 11/00*   (2006.01)
*B01D 46/24*   (2006.01)
*F17C 13/04*   (2006.01)

(52) U.S. Cl.
CPC ..... *B01D 46/2403* (2013.01); *B01D 46/0005* (2013.01); *F17C 11/007* (2013.01); *F17C 13/04* (2013.01); *B01D 2259/4525* (2013.01); *B01D 2265/028* (2013.01); *F17C 2201/0104* (2013.01); *F17C 2205/0323* (2013.01); *F17C 2205/0341* (2013.01); *F17C 2205/0391* (2013.01); *F17C 2209/22* (2013.01); *F17C 2221/033* (2013.01); *F17C 2265/012* (2013.01); *F17C 2270/0168* (2013.01)

(58) Field of Classification Search
CPC ............ B01D 46/0005; B01D 46/2403; B01D 2265/028; B01D 2259/4525; F17C 11/007; F17C 13/04; F17C 2201/0104; F17C 2205/0323; F17C 2205/0341; F17C 2205/0391; F17C 2209/22; F17C 2221/033; F17C 2265/012; F17C 2270/0168
USPC .... 96/108, 134, 149; 55/361, 374, 378, 379, 55/422, 505, 507; 206/0.7
See application file for complete search history.

(56) References Cited

U.S. PATENT DOCUMENTS 4,023,701 A * 5/1977 Dockery ................. F17C 11/00 206/0.7
4,523,548 A * 6/1985 Engel ..................... F02B 43/00 123/1 A (Continued)

FOREIGN PATENT DOCUMENTS

JP   H05196198 A   8/1993
JP   2006-273591 A   10/2006

(Continued)

*Primary Examiner* — Frank Lawrence
(74) *Attorney, Agent, or Firm* — Mintz Levin Cohn Ferris Glovsky and Popeo, P.C.; Peter F. Corless (57) ABSTRACT

A filter device for a gas container removes foreign substances mixed with gas in the gas container, and is integrally mounted with the gas container so as to ensure a maximum capacity of the gas container while providing a larger gas filter compared to existing external gas filters.

13 Claims, 11 Drawing Sheets

(56) References Cited

U.S. PATENT DOCUMENTS

| | | | | |
|---|---|---|---|---|
| 4,765,458 | A | * | 8/1988 | Flanigen ................. C04B 28/18 206/0.7 |
| 4,967,814 | A | * | 11/1990 | Day, Jr. ................. F17C 13/002 141/234 |
| 5,409,526 | A | * | 4/1995 | Zheng ................ B01D 53/0415 55/385.4 |
| 5,490,868 | A | * | 2/1996 | Whitlock ............. B01D 29/114 210/445 |
| 5,891,223 | A | * | 4/1999 | Shaw ..................... B01D 46/10 55/385.4 |
| 5,893,385 | A | | 4/1999 | Igarashi |
| 6,210,458 | B1 | * | 4/2001 | Shindo ............... B01D 46/0012 264/632 |
| 6,911,065 | B2 | * | 6/2005 | Watanabe ............... B01D 53/02 55/385.4 |
| 7,137,646 | B2 | | 11/2006 | Blackburn et al. |
| 8,167,967 | B2 | * | 5/2012 | Kim ................... B01D 39/2034 55/385.3 |
| 2003/0192430 | A1 | * | 10/2003 | Pearlstein ............... B01D 53/02 95/90 |
| 2010/0276024 | A1 | | 11/2010 | Iida et al. |

FOREIGN PATENT DOCUMENTS

| | | |
|---|---|---|
| JP | 2008-151219 A | 7/2008 |
| JP | 2010-253336 A | 11/2010 |
| JP | 2012-041864 A | 3/2012 |
| KR | 20-0298627 Y1 | 1/2003 |
| KR | 20-0330589 Y1 | 10/2003 |

\* cited by examiner

FILTER DEVICE FOR GAS CONTAINER AND METHOD OF INSTALLING THE SAME

CROSS-REFERENCE TO RELATED APPLICATION

This application claims under 35 U.S.C. § 119(a) the benefit of Korean Patent Application No. 10-2015-0112317 filed on Aug. 10, 2015, the entire contents of which are incorporated herein by reference.

BACKGROUND (a) Technical Field

The present invention relates to a filter device for a gas container and a method of installing the same, more particularly, it relates to a filter device that removes foreign substances mixed with gas in a gas container, and a method of installing the same.

(b) Description of the Related Art

Conventionally, natural gas vehicles using natural gas as fuel were mainly aimed at consuming natural gas which is produced in excess. However, in recent times, natural gas vehicles have been supplied in order to address air pollution caused by vehicles, particularly exhaust gas from large diesel vehicles.

Natural gas vehicles generally include compressed natural gas (CNG) vehicles, liquefied natural gas (LNG) vehicles, and adsorption natural gas (ANG) vehicles.

Among them, ANG vehicles are used in a manner wherein natural gas is pressed and stored in absorbents such as activated carbon, and these absorbents are stored in a gas container.

However, when the vehicle is driven in a state in which the gas container storing the absorbents is mounted to the vehicle, the absorbents break apart, and thus various functional components as well as an engine injector become clogged in the process of supplying natural gas from the gas container to the engine.

To resolve this problem, in the related art, a gas filter for removing foreign substances is mounted between a portion of the rear end of the gas container and multifunctional valves which are installed at the portion of the rear end of the gas container in the related art.

When the gas filter is outer-mounted at the rear end of the gas container, the multifunctional valves and the engine injector may be protected from foreign substances. However, since the gas filter has a large size, it is disadvantageous in that the capacity of the gas container is inevitably reduced.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides a filter device for a gas container, which is integrally mounted in a gas container so as to ensure increased capacity of the gas container while providing a larger gas filter compared to existing external gas filters, and a method of installing the same.

In a preferred embodiment, a filter device mounted in a sealed gas container having an opening portion includes a filter case having a latch portion tightly assembled in the opening portion of the gas container, and a filter body mounted inside or outside the filter case for removing foreign substances, the filter body being forcibly inserted into the gas container.

The filter case may have a folding portion integrally connected to the latch portion so as to form a tapered structure in which an outer diameter thereof is reduced, and a maximum outer diameter of the folding portion may be greater than a minimum inner diameter of the opening portion so that the latch portion is pressed and mounted into the opening portion. The filter case may have a plurality of through-holes for allowing gas fuel to flow through the filter case.

The folding portion may be made of a rubber material so as to be foldable when the filter case is forcibly inserted into the gas container.

In the gas container, a connecting portion of a multifunctional valve may be assembled in the opening portion, in which the latch portion of the filter case is inserted and mounted, so as to be adjacent to the latch portion, thereby preventing the latch portion from being separated from the opening portion.

In another preferred embodiment, a method of installing a filter device mounted in a sealed gas container having an opening portion includes temporarily assembling a gas filter, including a filter case having a latch portion tightly assembled in the opening portion, and a filter body mounted inside or outside the filter case, such that a portion of the gas filter is inserted into the gas container, inserting absorbents between the gas filter and the opening portion such that the gas container is filled with the absorbents, and forcibly inserting the temporarily assembled gas filter into the gas container so as to compress the absorbents in the gas container.

The gas filter is forcibly inserted into the gas container until the latch portion of the filter case is tightly assembled in the opening portion of the gas container, and a connecting portion of a multifunctional valve is assembled in the opening portion so as to be adjacent to the latch portion, thereby allowing the gas filter to be fixedly supported in a state in which the gas filter is inserted into the gas container.

In still another preferred embodiment, a filter device mounted in a sealed gas container having an opening portion includes a fixed ring tightly assembled into the opening portion, and a mesh, integrally connected to the fixed ring, for removing foreign substances, the mesh being forcibly inserted into the gas container.

In yet another preferred embodiment, a method of installing a filter device mounted in a sealed gas container having an opening portion includes filling the gas container with absorbents in which gas fuel is pressed and stored, forcibly inserting a mesh, integrally connected to a fixed ring tightly assembled in the opening portion, for removing foreign substances, into the gas container, so as to compress the absorbents with which the gas container is filled, and forcibly inserting the mesh into the gas container until the fixed ring is tightly assembled in the opening portion.

In still yet another preferred embodiment, a filter device mounted in a sealed gas container having an opening portion includes a hollow outer body having a latch portion tightly assembled in the opening portion of the gas container, a hollow inner body assembled inside the outer body so as to be linearly moved, and a mesh, tightly mounted between an end portion of the outer body and an end portion of the inner body, for removing foreign substances.

The inner body may have a plurality of through-holes for passing gas fuel, which passes through the mesh, therethrough. In addition, an elastic member may be installed between the outer body and the inner body in order to return the inner body which is forcibly moved to protrude toward one side of the outer body.

In addition, a support link may be located inside the mesh and be installed between the outer body and the inner body, and the support link may be bent such that the mesh is stretched when the inner body, which is forcibly moved to protrude toward one side of the outer body, returns.

In a further preferred embodiment, a method of installing a filter device mounted in a sealed gas container having an opening portion includes preparing a gas filter in which an elastic member is installed between an outer body having a latch portion tightly assembled in the opening portion and an inner body assembled inside the outer body so as to be linearly moved for the inner body's return, inserting the inner body, which is moved to protrude toward one side of the outer body, into the opening portion while the elastic member is forcibly extended, stretching a mesh, tightly attached between an end portion of the outer body and an end portion of the inner body, for removing foreign substances, while the inner body passes through the opening portion and is located inside the gas container, and forcibly inserting the outer body into the gas container until the latch portion of the outer body is tightly seated into the opening portion.

In the stretching a mesh, a support link, which is mounted between the outer body and the inner body and is foldably formed inside the mesh, may be located inside the gas container by passing through the opening portion, and simultaneously stretch the mesh while being folded by restoring force of the elastic member.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
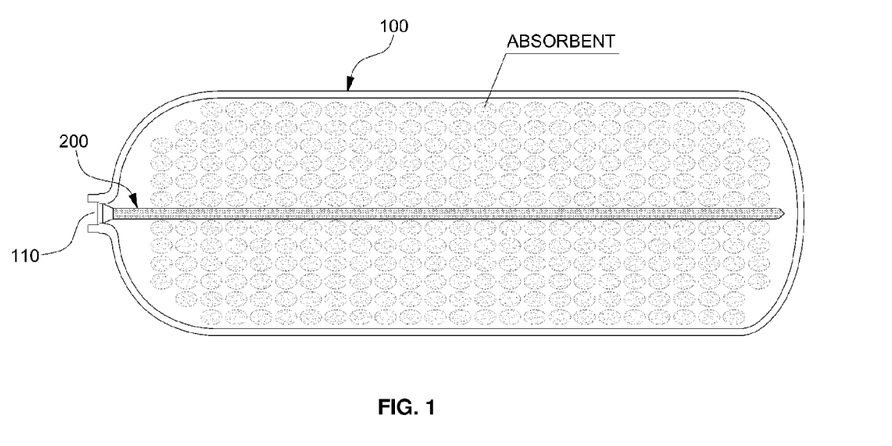
FIG. 1 is a schematic view illustrating a gas container in which a filter device according to a first embodiment of the present invention is installed.

As illustrated in FIG. 1, in the present invention, a gas filter 200 for removing foreign substances is integrally mounted in a gas container 100 including absorbents in which natural gas (gas fuel) is pressed and stored, and thus the capacity of the gas container 100 and the size of the gas filter can be increased compared to existing gas containers and gas filters.

A filter device, i.e., the gas filter according to the present invention is installed within the gas container 100 in a state in which the gas filter is mounted into an opening portion (or an entry portion) 110 for allowing natural gas to flow into or out of the gas container 100.

First, filter devices (gas filters) according to first and second embodiments of the present invention will be described in detail with reference to FIGS. 2A to 4.

Figure 2A:
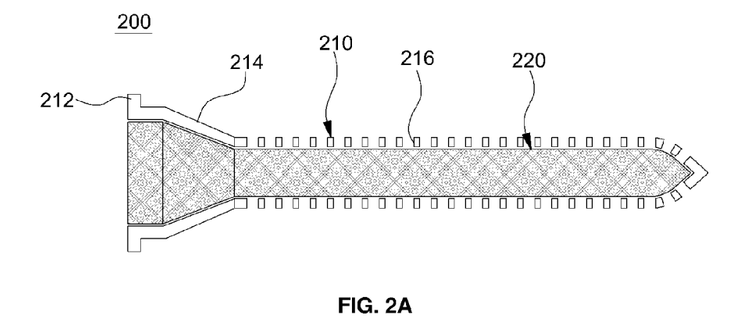
FIGS. 2A-2B are schematic views illustrating the filter device according to the first embodiment of the present invention.
Figure 2B:
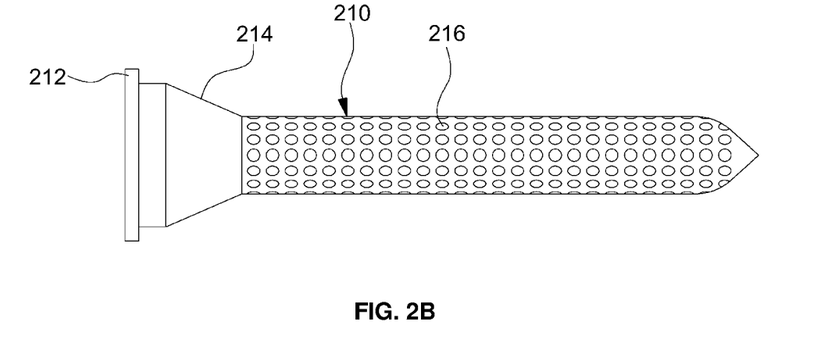

As illustrated in FIGS. 2A-2B, a gas filter 200 according to the first embodiment of the present invention is a filter device which is inserted and mounted in a sealed gas container 100 having an opening portion 110. The gas filter 200 includes a filter case 210, and a filter body 220 which is inserted and mounted inside the filter case 210.

Figure 4:
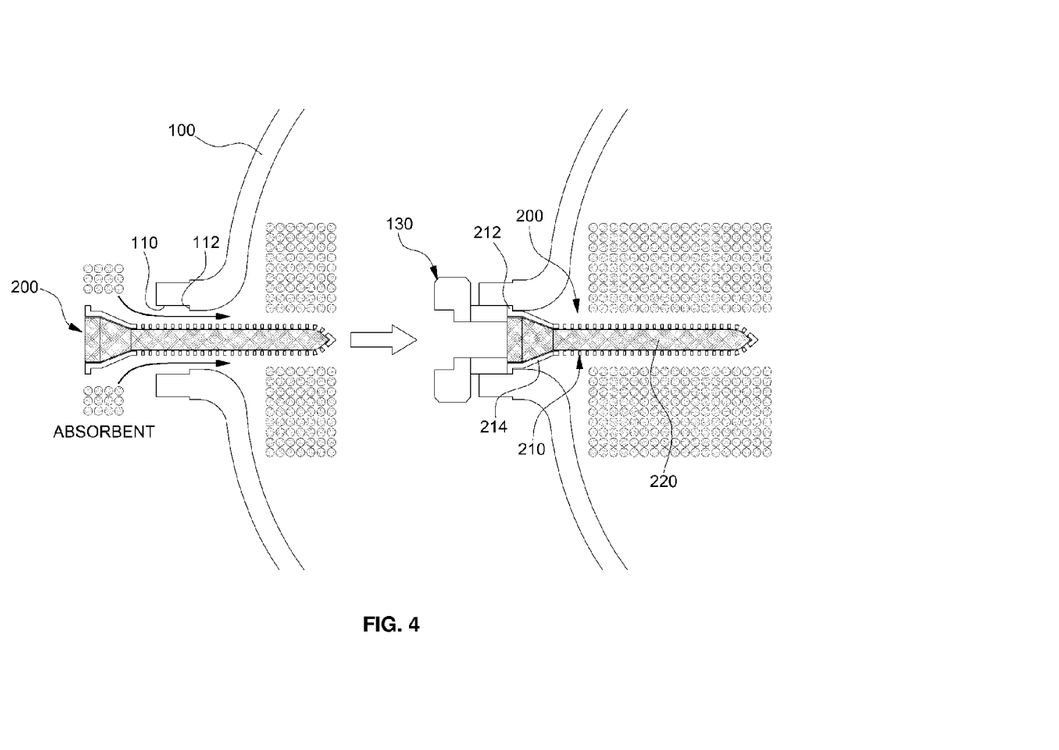
FIG. 4 is a schematic view illustrating the process of installing the filter device according to the first embodiment of the present invention in the gas container.

Referring to FIG. 4, the filter case 210 has a latch portion 212, which is formed at one side end thereof so as to be latched by and fixed into the opening portion 110 of the gas container 100, so that the filter case 210 is tightly assembled in the gas container 100. The opening portion 110 is formed with a stepped portion 112 for mounting and supporting the latch portion 212.

In addition, the filter case 210 has a folding portion 214, which is integrally connected to the latch portion 212 so as to form a tapered (inclined) structure in which the outer diameter thereof is reduced. The maximum outer diameter (the outer diameter at the portion connected to the latch portion) of the folding portion 214 is preferably greater than the minimum inner diameter of the opening portion 110, whereby the latch portion 212 may be pressed and fixed into the opening portion 110.

In addition, the filter case 210 has a plurality of through-holes 216 for allowing natural gas to flow through the filter case 210.

The filter body 220 may be formed as a filtration net for removing foreign substances contained in gas. The filter body 220 is forcibly inserted into the gas container 100 in a state in which the filter body 220 is mounted inside the filter case 210, so as to compress the absorbents with which the gas container 100 is filled.

Figure 3A:
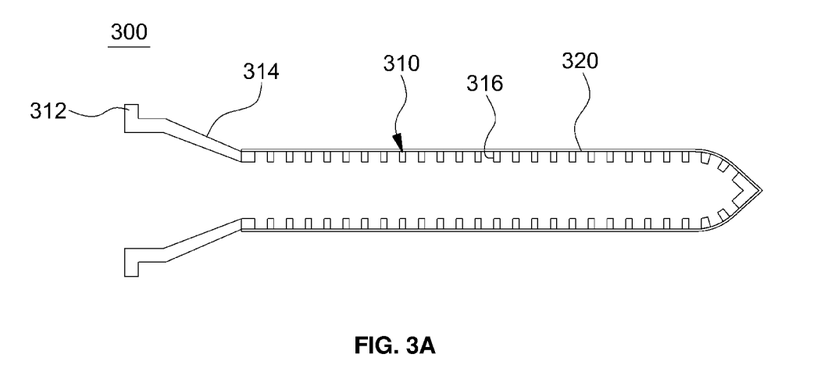
FIGS. 3A-3B are schematic views illustrating a filter device according to a second embodiment of the present invention.
Figure 3B:
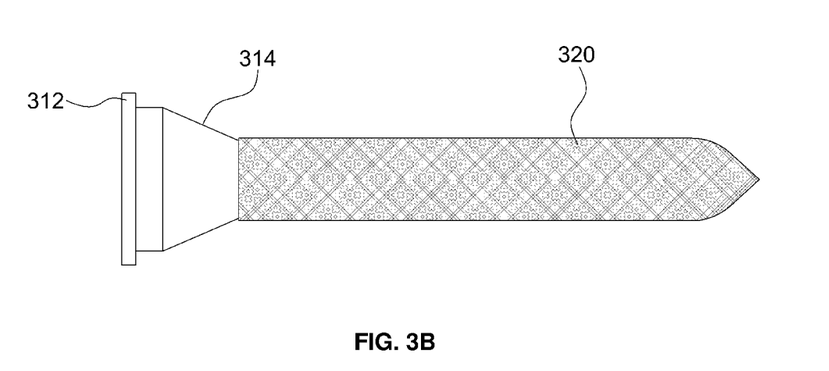

As illustrated in FIGS. 3A-3B, a gas filter 300 according to the second embodiment of the present invention has the same configuration and structure as the gas filter 200 of the first embodiment, except that a filter body 320 is mounted outside a filter case 310.

As illustrated in FIG. 4, in the gas container 100 including the gas filter 200, a connecting portion 130 of a multifunctional valve is fixedly assembled, by screwing, into the opening portion 110, in which the latch portion 212 of the filter case 210 is inserted and mounted, thereby being adjacent to the latch portion 212. Thus, the connecting portion 130 prevents the latch portion 212 from being separated (decoupled) from the opening portion 110, and serves to fix the latch portion 212 into the opening portion 110.

Now, the installation method of the gas filter 200 having the above configuration will be described with reference to FIG. 4.

First, as illustrated in FIG. 4, only a portion (the portion opposite to the latch portion) of the gas filter 200 is inserted and temporarily assembled in the gas container 100, and then the gas container 100 is filled with absorbents by inserting/inputting the absorbents between the gas filter 200 and the opening portion 110 of the gas container 100.

Next, the gas filter 200, only a portion of which is inserted into the gas container 100, is forcibly inserted into the gas container 100 until the latch portion 212 is latched by the stepped portion 112 of the opening portion 110, so as to compress the absorbents with which the gas container 100 is filled. When the gas filter 200 is forcibly inserted into the gas container 100 filled with the absorbents, the absorbents are pressed against one another and compressed.

In this case, the gas filter 200 is forcibly inserted into the gas container 100 until the latch portion 212 of the filter case 210 is tightly assembled into the opening portion 110 in a state in which the latch portion 212 is seated in the stepped portion 112 of the opening portion 110.

The connecting portion 130 of the multifunctional valve is assembled to the end portion of the opening portion 110 by screwing, and is adjacent to the latch portion 212, thereby allowing the gas filter 200 to be fixedly supported in a state in which the gas filter 200 is inserted and mounted into the gas container 100.

Hereinafter, filter devices (gas filters) according to third and fourth embodiments of the present invention will be described with reference to FIGS. 5 and 6.

Figure 5:
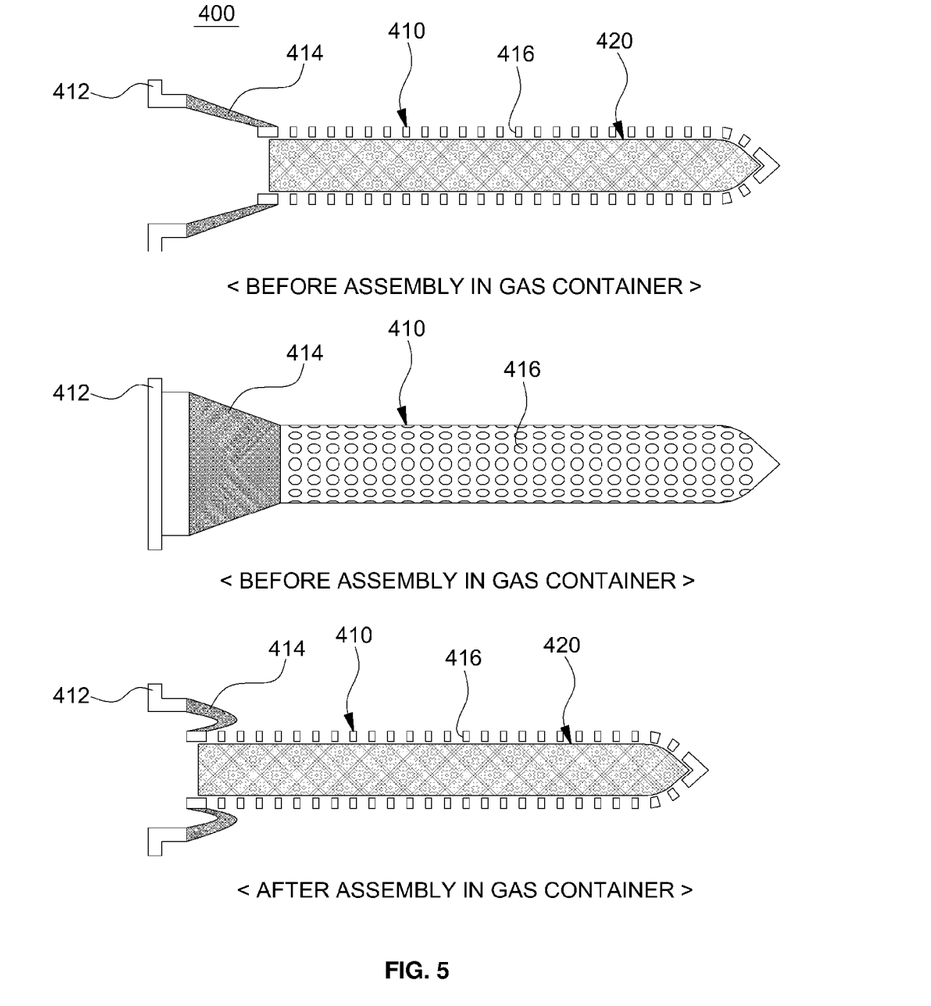
FIG. 5 is a schematic view illustrating a filter device according to a third embodiment of the present invention.

As illustrated in FIG. 5, a gas filter 400 according to the third embodiment of the present invention has the same configuration and structure as the gas filter 200 of the first embodiment, except that the gas filter 400 has a folding portion 414 which is foldable.

That is, the gas filter 400 includes a filter case 410, and a filter body 420 which is inserted and mounted inside the filter case 410. The filter case 410 has a latch portion 412, which is latched by and seated to the stepped portion 112 of the opening portion 110, and a folding portion 414 which is integrally connected to the latch portion 412 so as to have a tapered structure in which the outer diameter thereof is reduced.

Here, the folding portion 414 is formed of a structure or a material that is bendable and foldable when the filter case 410 including the filter body 420 is forcibly inserted into the gas container 100. For example, the folding portion 414 may be made of a rubber material that is flexibly foldable.

In the filter case 410, the folding portion 414 and all portions except the folding portion 414 are formed of different materials by injection molding.

Figure 6:
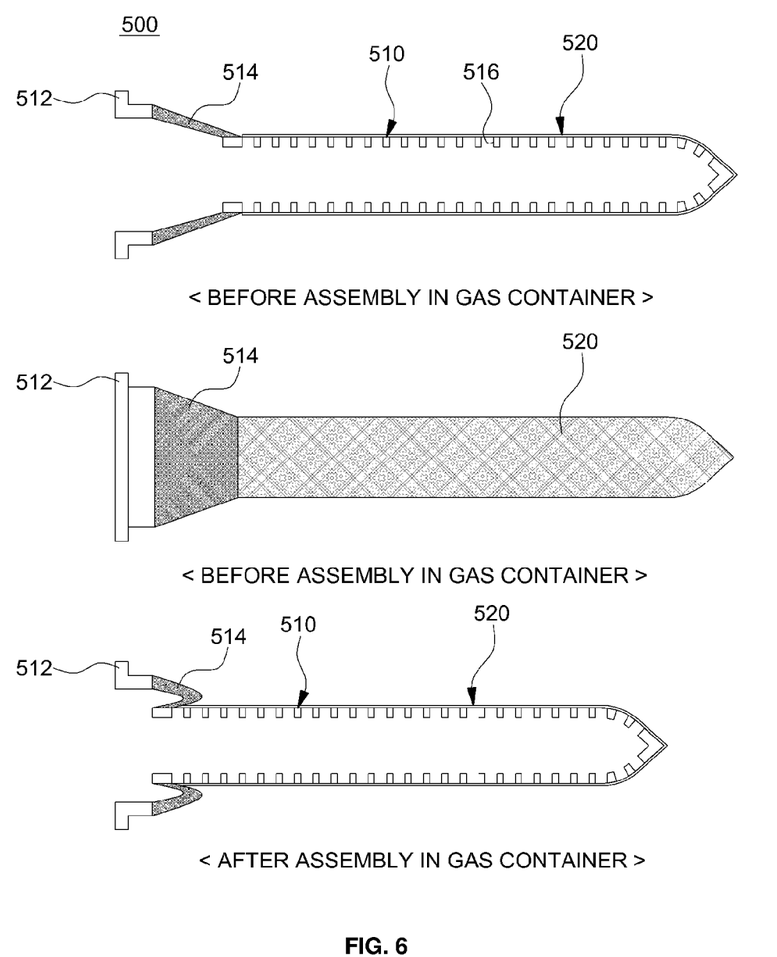
FIG. 6 is a schematic view illustrating a filter device according to a fourth embodiment of the present invention.

As illustrated in FIG. 6, a gas filter 500 according to the fourth embodiment of the present invention has the same configuration and structure as the gas filter 400 of the third embodiment, except that a filter body 520 is mounted outside a filter case 510.

Figure 7:
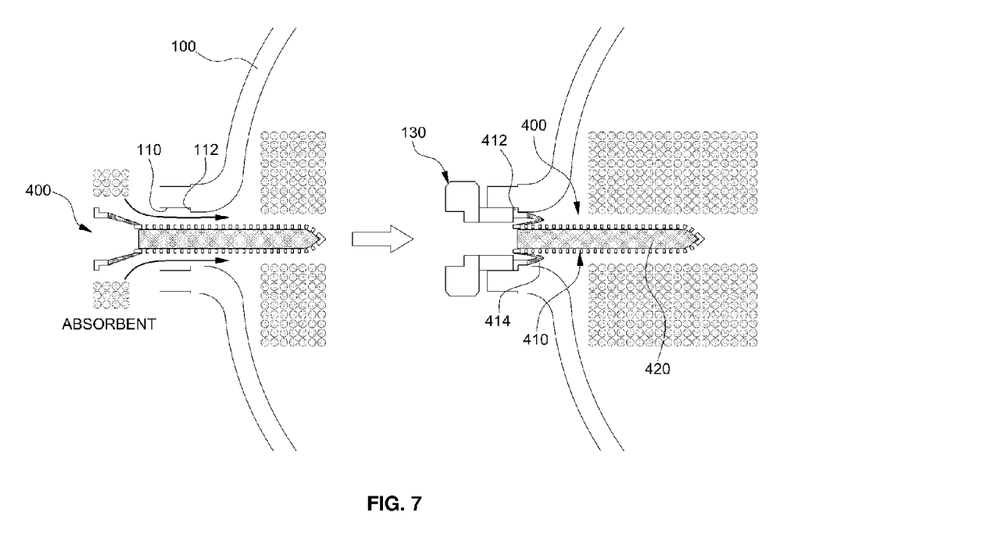
FIG. 7 is a schematic view illustrating the process of installing the filter device according to the third embodiment of the present invention in the gas container.

In addition, the gas filters 400 and 500 of the third and fourth embodiments may be installed in the gas container 100 through the same process as the method of installing the gas filter 200 described above. However, as illustrated in FIG. 7, the folding portion 414 is folded when the temporarily-assembled gas filter 400 is forcibly inserted into the gas container 100 (that is, the gas filter is forcibly assembled after the gas container is filled with absorbents).

Next, a filter device (a gas filter) according to a fifth embodiment of the present invention will be described in detail with reference to FIGS. 8 and 9.

Figure 8:
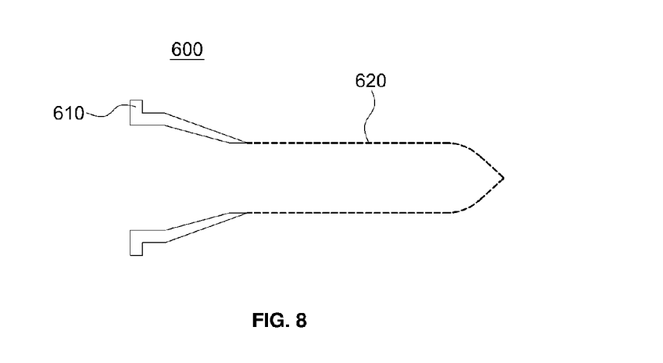
FIG. 8 is a schematic view illustrating a filter device according to a fifth embodiment of the present invention.

As illustrated in FIG. 8, a gas filter 600 according to the fifth embodiment of the present invention includes a fixed ring 610 which is tightly seated and mounted into the opening portion 110 of the gas container 100, and a mesh 620 for removing foreign substances, which is integrally connected to the fixed ring 610.

The fixed ring 610 has a ring shape, which is open at the central portion thereof such that natural gas may flow, when the fixed ring 610 is seated and mounted to the stepped portion 112 of the opening portion 110.

The mesh 620 is integrally connected to one side end of the fixed ring 610 and has an internal space which is open at one side thereof. The mesh 620 generally has a plurality of filtration holes in order to filter foreign substances contained in (mixed with) natural gas.

In the gas container 100, the connecting portion 130 of the multifunctional valve is assembled in the opening portion 110, in which the fixed ring 610 is inserted and mounted, so as to be adjacent to the fixed ring 610, thereby preventing the fixed ring 610 from being separated from the opening portion 110.

Now, the method of installing the gas filter 600 will be described with reference to FIG. 9.

Figure 9:
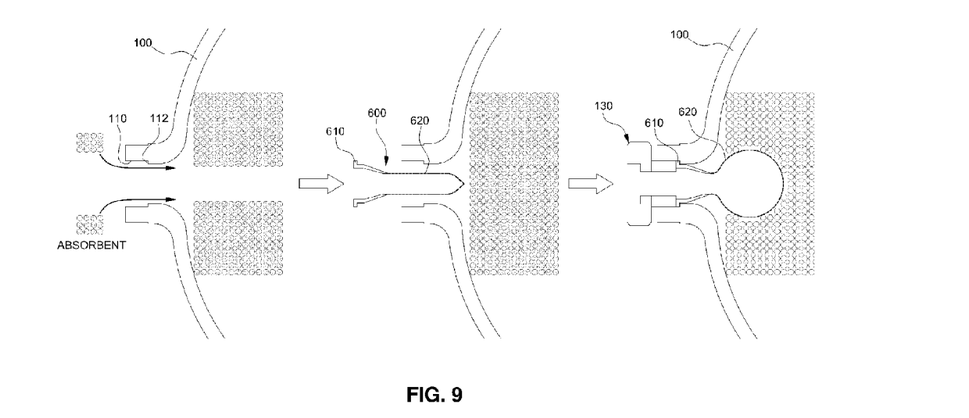
FIG. 9 is a schematic view illustrating the process of installing the filter device according to the fifth embodiment of the present invention in the gas container.

As illustrated in FIG. 9, the gas container 100 is first filled with absorbents, in which natural gas is pressed and stored, by the insertion of the absorbents, and then the mesh 620 is inserted into the gas container 100 so as to compress the absorbents with which the gas container 100 is filled.

In this case, the mesh 620 is forcibly inserted into the gas container 100 until the fixed ring 610 is latched by the stepped portion 112 of the opening portion 100 so as to be tightly assembled. The absorbents are pressed against one another and compressed when the mesh 620 is forcibly inserted into the gas container 100, thereby preventing the movement of the absorbents.

The connecting portion 130 of the multifunctional valve is assembled to the end portion of the opening portion 110 by screwing, and is adjacent to the fixed ring 610, thereby allowing the gas filter 600 to be fixedly supported in a state in which the gas filter 600 is inserted and mounted into the gas container 100.

Next, a filter device (a gas filter) according to a sixth embodiment of the present invention will be described in detail with reference to FIGS. 10 to 13.

Figure 10:
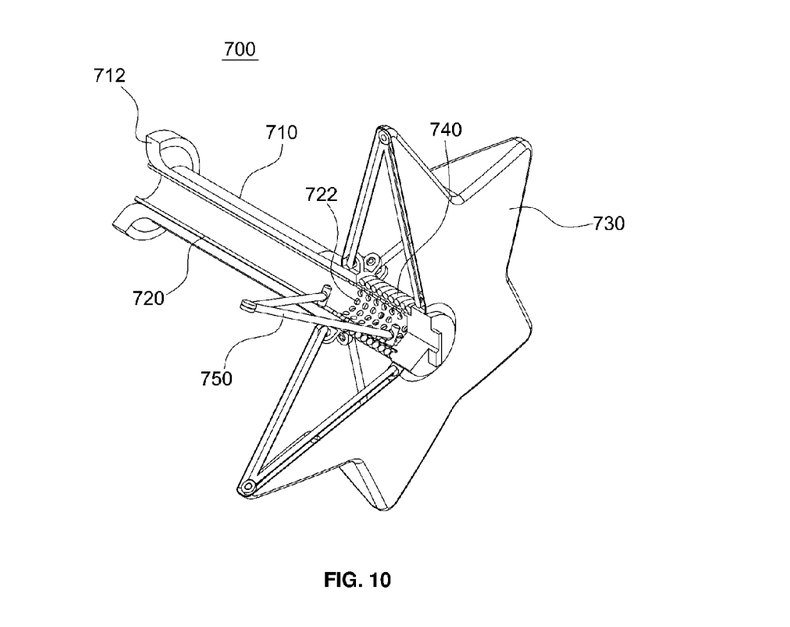
FIG. 10 is a cut-away perspective view illustrating a filter device according to a sixth embodiment of the present invention.
Figure 11:
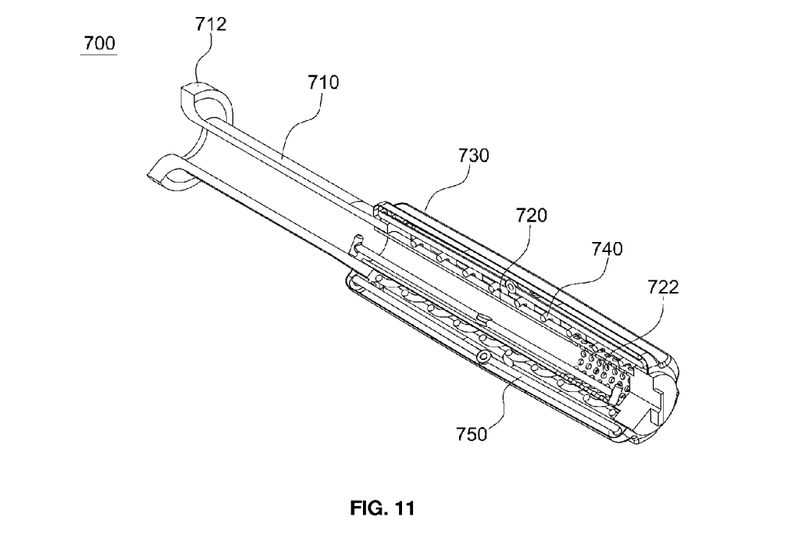
FIG. 11 is a cut-away perspective view illustrating a state in which the filter device of FIG. 10 is forcibly stretched.

As illustrated in FIGS. 10 and 11, a gas filter 700 according to the sixth embodiment of the present invention is a filter device which is inserted and mounted in a sealed gas container 100 having an opening portion 110. The gas filter 700 includes an outer body 710, an inner body 720, and a mesh 730.

The outer body 710 has a diameter adapted to pass through the opening portion 110 of the gas container 100 and has a hollow cylindrical shape. The outer body 710 has a latch portion 712 which is formed at one side end portion thereof so as to be latched by, tightly seated and fixed into the opening portion 110.

The inner body 720 has a hollow cylindrical shape. The inner body 720 is inserted and assembled inside (or is fitted outside) the outer body 710 so as to be linearly movable.

An elastic member 740 and a support link 750 are mounted together with the mesh 730 between the outer body 710 and the inner body 720.

The mesh 730 serves to filter and remove foreign substances mixed with gas fuel. The mesh 730 is tightly attached between the other side end portion of the outer body 710 and the other side end portion of the inner body 720. Accordingly, gas fuel, which flows into or out of the gas container 100 through the opening portion 110, passes through the mesh 730.

Thus, the inner body 720 has a plurality of through-holes 722 formed in the lower end portion thereof, which protrudes outward from the outer body 710 in a state in which the inner body 720 is inserted into the outer body 710 by the compression and restoration of the elastic member 740, such that gas fuel passing through the mesh 730 may flow through the through-holes 722.

The elastic member 740 is mounted between the other side end portion of the outer body 710 and the other side end portion (specifically, the stepped portion) of the inner body 720 so as to be extensible and restorable, in a state in which the elastic member 740 is fitted to the outer peripheral surface of the lower end portion of the inner body 720. The elastic member 740 is extended when the inner body 720 is forcibly moved so as to protrude outward from the outer body 710 (or so as to longitudinally extend), thereby generating elastic restoring force.

The support link 750 is formed such that its central portion is bendable and foldable. The support link 750 is located inside the mesh 730 to be connected and mounted between the other side end portion of the outer body 710 and the other side end portion of the inner body 720. The support link 750 is linearly stretched by external force when the inner body 720 is moved to protrude outward from the outer body 710. When the external force is removed and the inner body returns, the support link 750 is bent while its central portion is folded. In this case, the mesh 730 is tensely stretched without folding.

Here, respective end portions of the support link 750 are rotatably coupled to the outer body 710 and the inner body 720.

Now, the method of installing the gas filter 700 will be described with reference to FIGS. 12A to 12D.

Figure 12A:
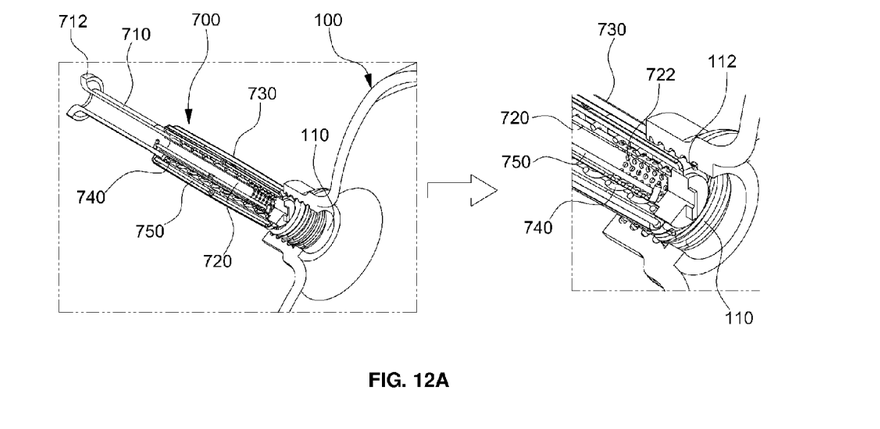
FIGS. 12A to 12D are views illustrating the process of installing the filter device according to the sixth embodiment of the present invention in the gas container.
Figure 12B:
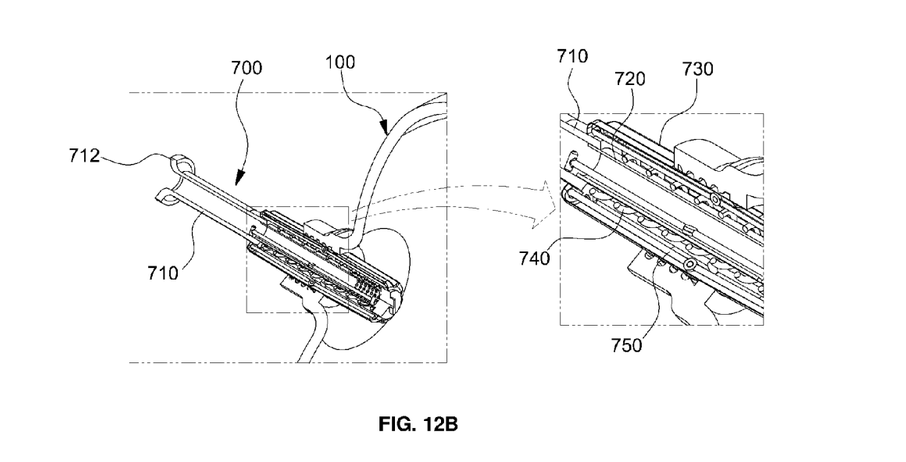

First, as illustrated in FIGS. 12A and 12B, after the gas container 100 is filled with absorbents by the insertion thereof before the gas filter 700 is inserted into the gas container 100, this gas filter 700 is prepared, and is then inserted into the opening portion 110 of the gas container 100 in a state in which the inner body 720 of the gas filter 700 is manually pulled and moved so as to protrude outward (in one direction) from the outer body 710.

In this case, when the inner body 720 is moved outward from the outer body 710, the elastic member 740 is forcibly extended to generate restoring force, and the support link 750 is linearly stretched.

That is, the inner body 720 is inserted into the opening portion 110 of the gas container 100 in a state in which the support link 750 is linearly stretched and the elastic member 740 is forcibly extended.

In this case, the elastic member 740 is maintained in the extended state until the support link 750 completely passes through the opening portion 110. When the support link 750 completely passes through the opening portion 110 and is located within the gas container 100, the elastic member 740 moves the inner body 720 toward the inside of the outer body 710 while being restored by the elastic restoring force.

Figure 12C:
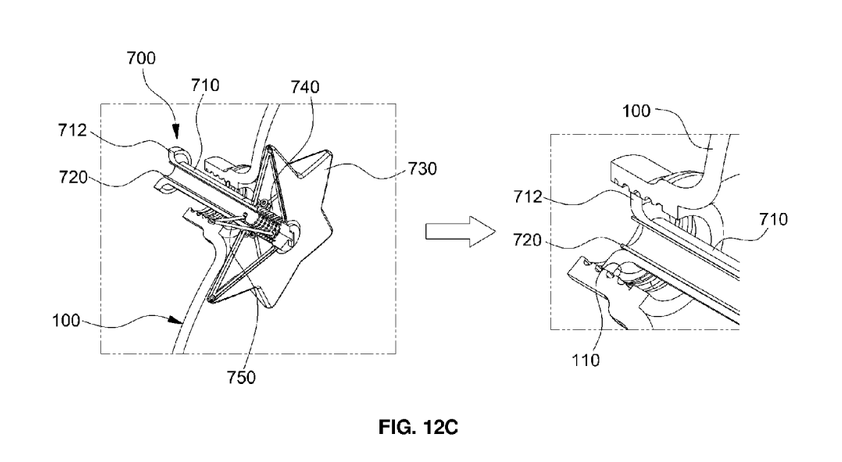

The support link 750 is restored to be bent outward and at the same time tensely stretches the mesh 730, while the inner body 720 is moved and returns to the inside of the outer body 710.

In order words, as illustrated in FIG. 12C, the inner body 720 completely passes through the opening portion 110 and is located inside the gas container 100 while the mesh 730 is stretched without folding by the support link 750.

Next, the outer body 710 is forcibly inserted into the gas container 100 until the latch portion 712 of the outer body 710 is tightly latched by and mounted into the opening portion 110.

In this way, when the gas filter 700 is forcibly inserted and mounted into the gas container 100, the absorbents included in the gas container 100 are pressed against one another and compressed.

Figure 12D:
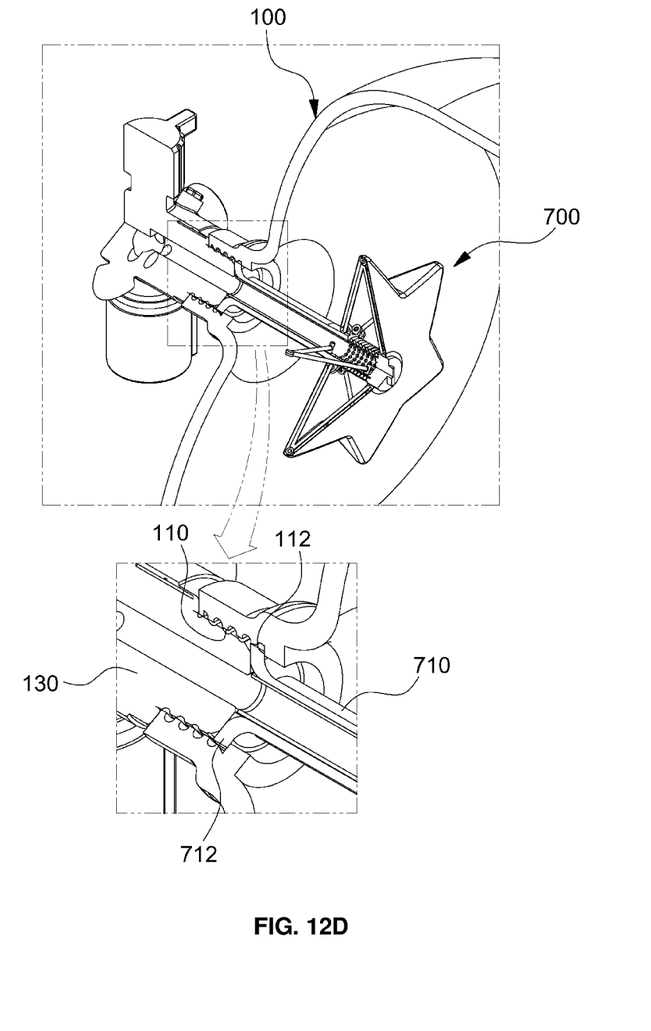

Next, as illustrated in FIG. 12D, the connecting portion 130 of the multifunctional valve is assembled to the end portion of the opening portion 110 by screwing, and is adjacent to the latch portion 712, thereby fixedly supporting the outer body 710 in a state in which the gas filter 700 is inserted and mounted into the gas container 100.

Figure 13:
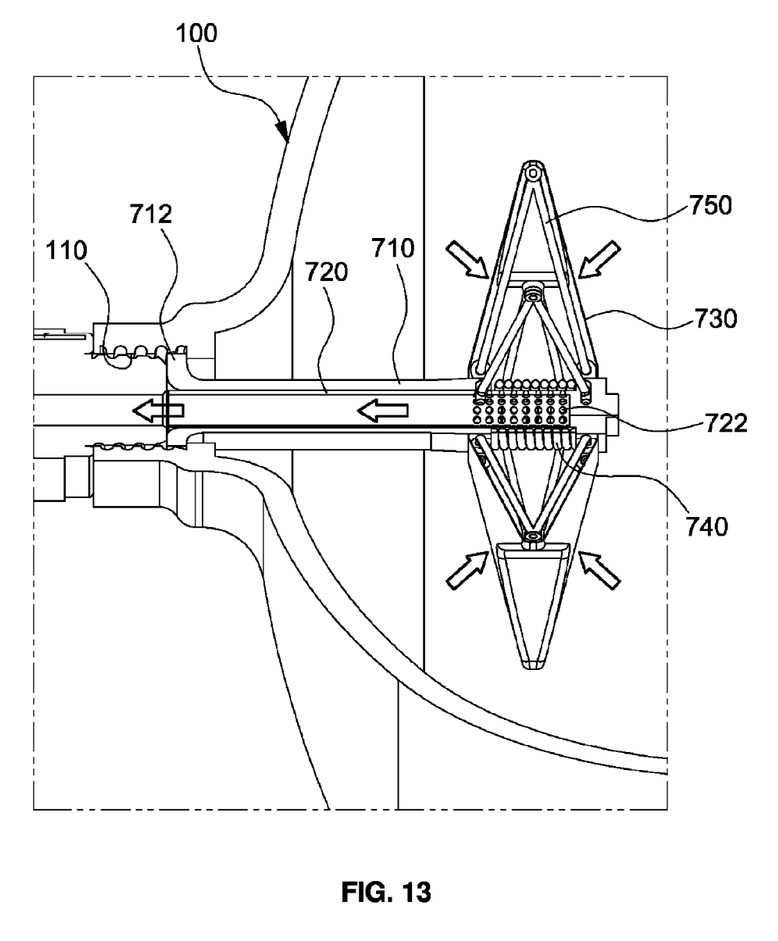
FIG. 13 is an exemplified view illustrating a usage state of the filter device according to the sixth embodiment of the present invention.

In the gas filter 700 which is integrally mounted into the gas container 100, gas fuel flowing into or out of the gas container 100 passes through the mesh 730. Thus, foreign substances contained in the gas fuel are filtered while the gas fuel passes through the mesh 730.

In accordance with the present invention, the gas filter for removing foreign substances is integrally mounted in the gas container, and thus the capacity of the gas container can be increased and secured, and a large gas filter can be used, compared to existing external gas filters.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A filter device mounted in a gas container having an opening portion, the filter device comprising:
   a filter case having a latch portion tightly assembled in the opening portion of the gas container; and
   a filter body, mounted inside or outside the filter case, for removing foreign substances, the filter body being forcibly inserted into the gas container,
   wherein the filter case has a folding portion integrally connected to the latch portion so as to form a tapered structure in which an outer diameter thereof is reduced, and a maximum outer diameter of the folding portion is greater than a minimum inner diameter of the opening portion so that the latch portion is pressed and mounted into the opening portion.

2. The filter device of claim 1, wherein the filter case has a plurality of through-holes for allowing gas fuel to flow through the filter case.

3. The filter device of claim 1, wherein the folding portion is foldable when the filter case is forcibly inserted into the gas container.

4. The filter device of claim 1, wherein the folding portion is made of a rubber material so as to be foldable when the filter case is forcibly inserted into the gas container.

5. The filter device of claim 1, wherein, in the gas container, a connecting portion of a multifunctional valve is assembled in the opening portion, in which the latch portion of the filter case is inserted and mounted, so as to be adjacent to the latch portion, thereby preventing the latch portion from being separated from the opening portion.

6. A filter device mounted in a gas container having an opening portion comprising:
   a hollow outer body having a latch portion tightly assembled in the opening portion of the gas container;
   a hollow inner body assembled inside the outer body so as to be linearly moved; and
   a mesh, tightly mounted between an end portion of the outer body and an end portion of the inner body, for removing foreign substances.

7. The filter device of claim 6, wherein the inner body has a plurality of through-holes for passing gas fuel, which passes through the mesh, therethrough.

8. The filter device of claim 6, wherein an elastic member is installed between the outer body and the inner body in order to return the inner body which is forcibly moved to protrude toward one side of the outer body.

9. The filter device of claim 6, wherein a support link is located inside the mesh and is installed between the outer body and the inner body, and the support link is bent such that the mesh is stretched when the inner body, which is forcibly moved to protrude toward one side of the outer body, returns.

10. A method of installing a filter device mounted in a sealed gas container having an opening portion, the method comprising the steps of:
   preparing a gas filter in which an elastic member is installed between an outer body having a latch portion tightly assembled in the opening portion and an inner body assembled inside the outer body so as to be linearly moved for return of the inner body;
   inserting the inner body, which is moved to protrude toward one side of the outer body, into the opening portion while the elastic member is forcibly extended;
   stretching a mesh, tightly attached between an end portion of the outer body and an end portion of the inner body, for removing foreign substances, while the inner body passes through the opening portion and is located inside the gas container; and
   forcibly inserting the outer body into the gas container until the latch portion of the outer body is tightly seated into the opening portion.

11. The method of claim 10, wherein, in the step of stretching the mesh, a support link, which is mounted between the outer body and the inner body and is foldably formed inside the mesh, is located inside the gas container by passing through the opening portion, and simultaneously stretches the mesh while being folded by restoring force of the elastic member.

12. The method of claim 10, further comprising the step of:
   assembling a connecting portion of a multifunctional valve in the opening portion such that the connecting portion is adjacent to the latch portion, thereby allowing the gas filter to be inserted and fixed into the gas container.

13. The method of claim 10, wherein, in the step of inserting the inner body, the gas container is filled with absorbents, in which gas fuel is pressed and stored, before the inner body is inserted into the opening portion.

* * * * *